United States Patent
Marx et al.

(10) Patent No.: US 6,548,930 B1
(45) Date of Patent: Apr. 15, 2003

(54) ELECTRIC MOTOR

(75) Inventors: Peter Marx, Kassel (DE); Bernd Jäger, Fritzlar (DE); Hans-Dieter Wilhelm, Neu Anspach (DE); Michael Bämpfer, Rotenburg (DE)

(73) Assignee: Mannesmann VDO AG, Frankfurt am Main (DE)

( * ) Notice: Subject to any disclaimer, the term of this patent is extended or adjusted under 35 U.S.C. 154(b) by 0 days.

(21) Appl. No.: 09/511,722

(22) Filed: Feb. 21, 2000

(30) Foreign Application Priority Data

Feb. 19, 1999 (DE) .......................... 199 06 884

(51) Int. Cl.⁷ .............................. H02K 5/24; H02K 5/08
(52) U.S. Cl. ..................................... 310/154.14; 310/43
(58) Field of Search ..................... 310/154.03, 154.05, 310/154.06, 154.14, 154.16, 154.17, 154.19, 91, 43, 156.16; 417/336, 410.1, 410.4; 418/171, 182

(56) References Cited

U.S. PATENT DOCUMENTS

| | | | | |
|---|---|---|---|---|
| 3,083,310 A | * | 3/1963 | Tweedy ...................... | 310/154 |
| 3,663,850 A | * | 5/1972 | Phelon ....................... | 310/154 |
| 3,988,623 A | * | 10/1976 | Yamaguchi et al. ......... | 310/154 |
| 4,225,799 A | * | 9/1980 | Bishai ....................... | 310/154 |
| 4,338,533 A | * | 7/1982 | Grafenschnell ............. | 310/154 |
| 4,619,588 A | * | 10/1986 | Moore, III .................. | 417/366 |
| 4,636,107 A | | 1/1987 | Casler et al. | |
| 4,795,932 A | * | 1/1989 | Long ..................... | 310/154.14 |
| 5,874,794 A | * | 2/1999 | Trammell et al. ........... | 310/154 |

FOREIGN PATENT DOCUMENTS

| | | | | |
|---|---|---|---|---|
| AT | DE-AS2060732 | 6/1972 | ............ | H02K/5/12 |
| DE | P 20 60 732.3 | 12/1970 | | |
| DE | 3008937 A1 | 9/1981 | ............ | H02K/3/46 |
| DE | 3426996 A1 | 6/1986 | ............ | H02K/1/06 |
| DE | 9312375.2 | 6/1995 | ............ | H02K/5/04 |
| DE | 19652085 A1 | 6/1998 | ............ | H02K/1/17 |
| FR | 1552542 | 1/1968 | | |
| GB | 1 314 472 | 6/1970 | ............ | H02K/1/18 |
| JP | 60009355 | 1/1985 | .......... | H02K/21/08 |

\* cited by examiner

*Primary Examiner*—Tran Nguyen
(74) *Attorney, Agent, or Firm*—Richard A. Speer; Mayer, Brown, Rowe & Maw

(57) ABSTRACT

An electric motor for a fuel pump wherein fuel flows through the pump, includes spring elements provided for holding magnetic shells in the stator have a face which points toward a rotor and is flush with the magnetic shells. Turbulence in the flow of the fuel within the electric motor are thereby kept particularly low. The pressure loss during the flow through the electric motor thus becomes lower. The pump according to the invention consequently has high efficiency.

5 Claims, 2 Drawing Sheets

ELECTRIC MOTOR

BACKGROUND OF THE INVENTION

1. Field of the Invention

The present invention relates to an electric motor for a feed pump. Specifically, the present invention is directed to a fuel pump for a motor vehicle, the electric motor having a rotor and a stator with at least two magnetic shells and a spring element for prestressing the magnetic shells in order to hold them in their desired position within a housing.

2. Description of the Related Art

Electric motors are typically used in present-day fuel pumps or for driving cooling-fluid pumps or oil pumps and various designs are generally known in practice. In this context, the electric motor forms with the feed pump a pre-assemblable structural feed unit. The fluid to be fed flows mostly through the electric motor, so that the feed unit has a highly compact design.

One example of such an electric motor is found in DE 196 52 085 A1, wherein the magnetic shells are pressed by a spring element against stops arranged on a tubular housing. The spring element is manufactured from a bandlike or wirelike spring material.

One disadvantage of the known electric motor is that, on account of the stops and the spring element, the stator has a plurality of steps directed toward the rotor. When the electric motor is used in the feed pump and has the fluid flowing through it, the steps cause turbulence in the fluid. The turbulence leads to the formation of gas bubbles and to a reduction in the efficiency of the feed pump. One problem to which the present invention is directed is the design of an electric motor of the type initially mentioned which, when used as a feed pump, it generates particularly low turbulence in the fluid flow.

SUMMARY OF THE INVENTION

In the present invention, this problem is solved by providing a gap that is approximately the same width as the spacing between the magnetic shells and the rotor between the spring element and the rotor. By virtue of this design, an approximately annular gap of essentially uniform thickness is located between the stator and the rotor. Consequently, turbulence in the flow between the rotor and the stator are kept particularly low. The pressure loss during the flow of the medium through the electric motor is thereby reduced. As a result, the pump according to the invention has particularly high efficiency. Furthermore, the reduction in the turbulence in the flow leads to particularly low noise emission from the feed unit provided with the electric motor according to the invention.

The electric motor according to the invention requires particularly few components to be assembled, if the spring element has, toward the rotor, an essentially smooth face arranged level with the radially inner boundary of the magnetic shells. By virtue of this design, the radially inner face of the magnetic shells is continued by the spring elements, so that the stator, on its side facing the rotor, has a face which is flush with the magnetic shells. Turbulence in the flow can therefore be kept particularly low. This leads to a pronounced reduction in the formation of gas bubbles in the flow and to a particularly high efficiency for the feed pump.

In the case of a single spring element for holding two magnetic shells, turbulence within the flow can be kept particularly low if stops of the housing of the stator, which are provided for supporting the magnetic shells, are concealed by a diaphragm. According to an advantageous development of the invention, the turbulence in the flow are kept particularly low if the spring element and the diaphragm for the stops extend over the entire length of the magnetic shells.

The spring element of the known electric motor could be provided with a diaphragm, for example that is level with the radially inner boundary of the magnetic shells. This leads, however, to a complicated design for the spring element. Furthermore, the diaphragm would have to be secured against release from the spring element, since a separation of the diaphragm and spring element may cause a blockage of the electric motor. According to another advantageous development of the invention, the spring element does not require a diaphragm to be additionally assembled if the spring element has an arcuate portion designed to correspond to the radially inner boundary of the magnetic shells, and if legs led radially outward are arranged on the two sides of the arcuate portion which face the magnetic shells.

According to another advantageous development of the invention, the spring element can be assembled in a particularly simple way if free ends of the legs are angled so as to point toward one another. According to another advantageous development of the invention, the spring element is fixed reliably in an intended position in the stator if the spring element has a C-shaped portion bearing with a middle region on a tubular housing, and if a diaphragm is arranged, in the region level with the magnetic shells, at one end of the C-shaped portion. By virtue of this design, the spring element is prestressed radially outward due to its inherent elasticity.

According to another advantageous development of the invention, the free end of the diaphragm is held reliably in its intended position distant from the rotor, if the diaphragm is designed to be supported on the second free end of the C-shaped portion. According to another advantageous development of the invention, the spring element has particularly high stability if the diaphragm has a web supported radially on the outside.

According to another advantageous development of the invention, the stator can be designed to be particularly smooth on its side facing the rotor, if the spring element is formed as a plastic molding. The spring element formed as a plastic molding could, for example, be of tubular design and the necessary prestress could be generated by virtue of the shape of its wall. However, according to another advantageous development of the invention, the plastic molding has a particularly simple design if the spring element in the form of a plastic molding is solid. The magnetic shells are thereby stressed into their intended position as a result of the elasticity of the material of the plastic molding.

As in the known electric motor, the spring element could prestress the magnetic shells against stops of the stator. A disadvantage of this design, however, is that, in order to avoid turbulence, the stops have to be covered with a diaphragm to be assembled separately. The electric motor according to the invention has a particularly simple design, however, if a plurality of spring elements for prestressing the magnetic shells against the housing are provided so as to correspond to the number of magnetic shells. By virtue of this design, a spring element is arranged in each case at mutually opposite lateral boundaries of the magnetic shells, so that, in the simplest instance, the stator does not require any stop for the magnetic shells. Since, for example in the case of two magnetic shells, the stator consequently also has two spring elements, long prestressing excursions, along with low deformations of the spring elements in each case, can be achieved.

The invention permits numerous embodiments. In order to make its basic principal even clearer, several of these are illustrated in the drawing and are described below with reference to the drawings wherein:

DETAILED DESCRIPTION OF THE PREFERRED EMBODIMENTS

Figure 1:
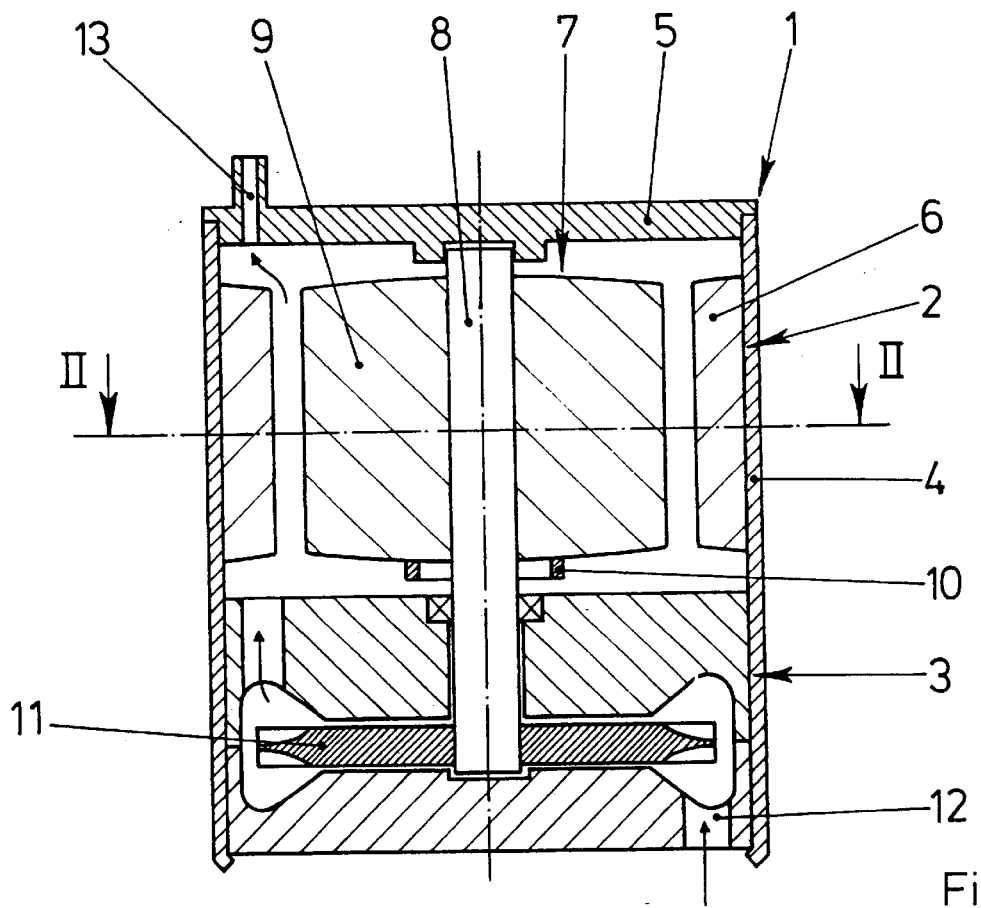
FIG. 1 is a diagrammatic illustration of a feed unit with an electric motor according to the invention, shown in longitudinal section.

FIG. 1 illustrates a pump unit 1 which in the exemplary embodiment is used for feeding fuel out of a fuel tank of a motor vehicle. The mechanism is comprised of a feed pump 3 driven by an electric motor 2 in accordance with the present invention. The feed unit 1 has a tubular housing 4 which, on its side located opposite the feed pump 3, is closed by a bearing plate 5. The electric motor 2 has a stator 6 and a rotor 7 with coils 9 arranged on a shaft 8. Moreover, the rotor 7 has an armature 10 for supplying the coils 9 with electric current via carbon brushes which are not illustrated. An impeller 11 of the feed pump 3 is fixed to rotating shaft 8. The impeller 11 rotates within the housing 4 and feeds fuel from an intake duct 12 through the housing 4 and the electric motor 2 to a connection piece 13 formed in the bearing plate 5. For the sake of clarity, the flow of the fuel is identified in the drawing by arrows.

Figure 2:
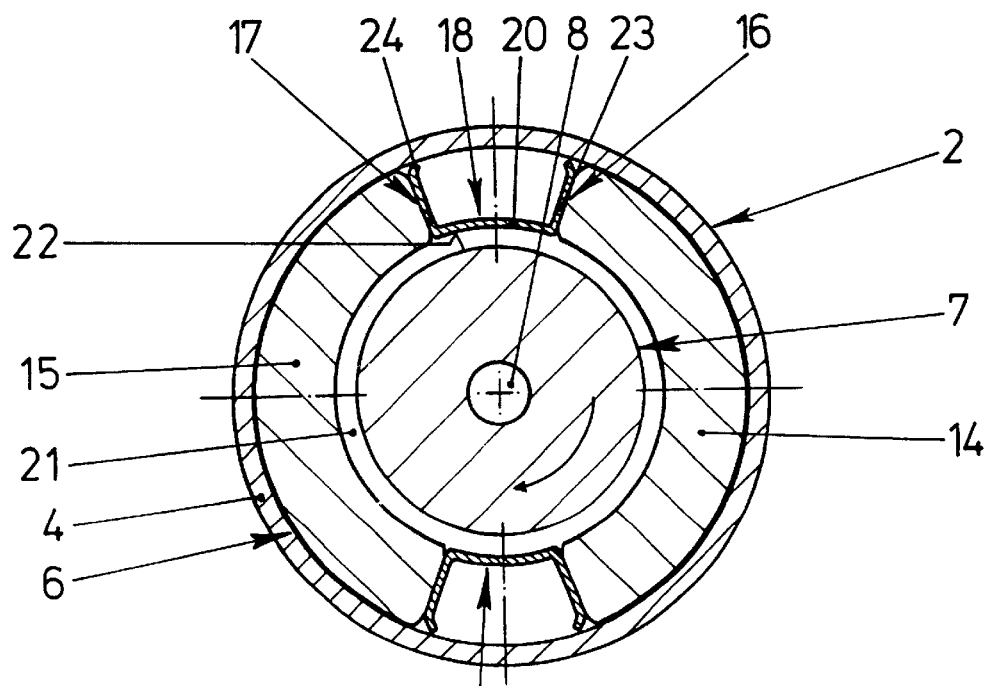
FIG. 2 is a cross section through the electric motor from FIG. 1 along the line II—II.

FIG. 2 is a sectional illustration through the electric motor 2 of FIG. 1. The exemplary embodiment of the electric motor 2 for illustrating the present invention has two magnetic shells 14, 15. Such an electric motor 2 may, of course, also have more than two magnetic shells 14, 15. The magnetic shells 14, 15 are stressed, in each case at their lateral edges 16, 17, away from one another toward the inner side of the housing 4 by spring elements 18, 19. The magnetic shells 14, 15 are thereby held in their desired position.

The spring elements 18, 19 have an arcuate portion 20 on their side facing the rotor 7 and form, with the magnetic shells 14, 15, the radially inner boundary of the stator 6. A gap 21 between the rotor 7 and the stator 6 therefore has approximately the same width at every point. As a result of this, and because the stator 6 has a face 22 designed to be smooth on its side facing the rotor 7, the fuel fed through the gap 21 is subjected to only insignificant turbulence. For prestressing the magnetic shells 14, 15, the spring elements 18, 19 have in each case, on their arcuate portions 20, legs 23, 24 led radially outward. The free ends of the legs 23, 24 are bent toward one another, so that the spring elements 18, 19 can be assembled quite simply.

Figure 3:
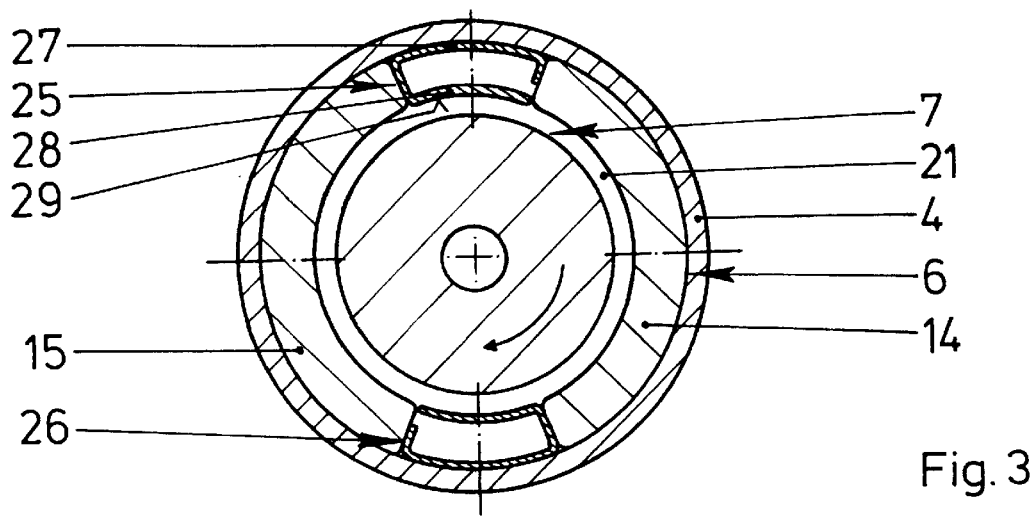
FIG. 3 illustrates an alternate embodiment of the electric motor according to the invention in cross sections.

FIG. 3 shows an alternate exemplary embodiment of the electric motor according to the invention in cross section. This embodiment differs from that of FIG. 2 essentially in that the magnetic shells 14, 15 are held by boxlike spring elements 25, 26. The spring elements 25, 26 each have a C-shaped portion 27 bearing with a middle region on the tubular housing 4. A diaphragm 28 is arranged, level with the radially inner boundary of the magnetic shells 14, 15, at one end of the C-shaped portion 27. This diaphragm 28 is led as far as the second end of the C-shaped portion 27 of the spring element 25, 26 and is supported at this point. That side of the diaphragm 28 which points toward the rotor 7 thus forms a smooth face 29 arranged level with the radially inner boundary of the magnetic shells 14, 15.

Figure 4:
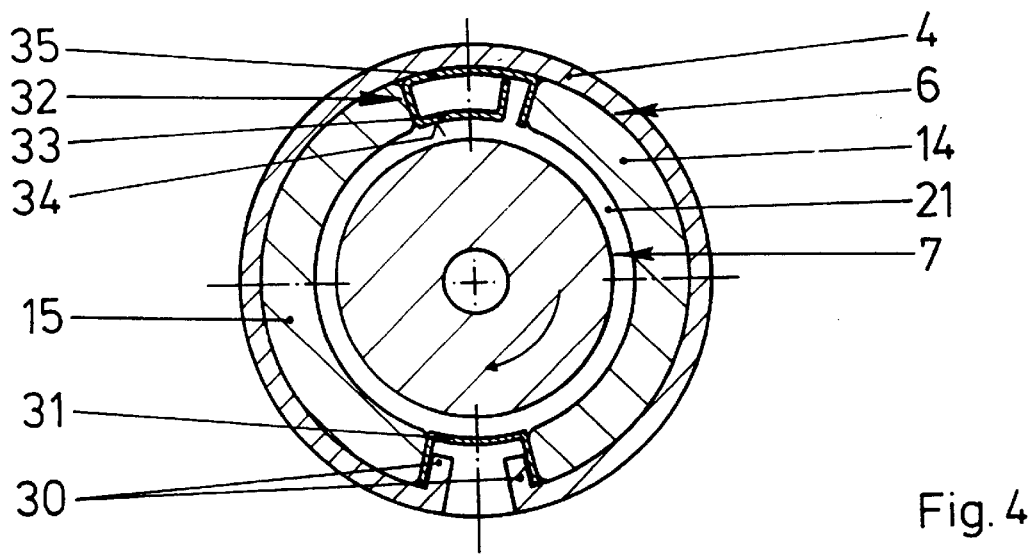
FIG. 4 illustrates an alternate embodiment of the electric motor according to the invention in cross sections.

FIG. 4 shows a further exemplary embodiment of the electric motor according to the invention in cross section, in which the housing 4 has stops 30 for the magnetic shells 14, 15. The stops 30 are covered by a diaphragm 31. A single spring element 32 for prestressing the magnetic shells 14, 15 against the stops 30 is arranged on the side located opposite said stops. The spring element 32 has a diaphragm 33 angled radially outward. The diaphragm 33 has a smooth face 34 in its region facing the rotor 7. The diaphragm 33 is supported with its free end on a C-shaped portion 35 of the spring element 32, said portion bearing on the housing 4.

Figure 5:
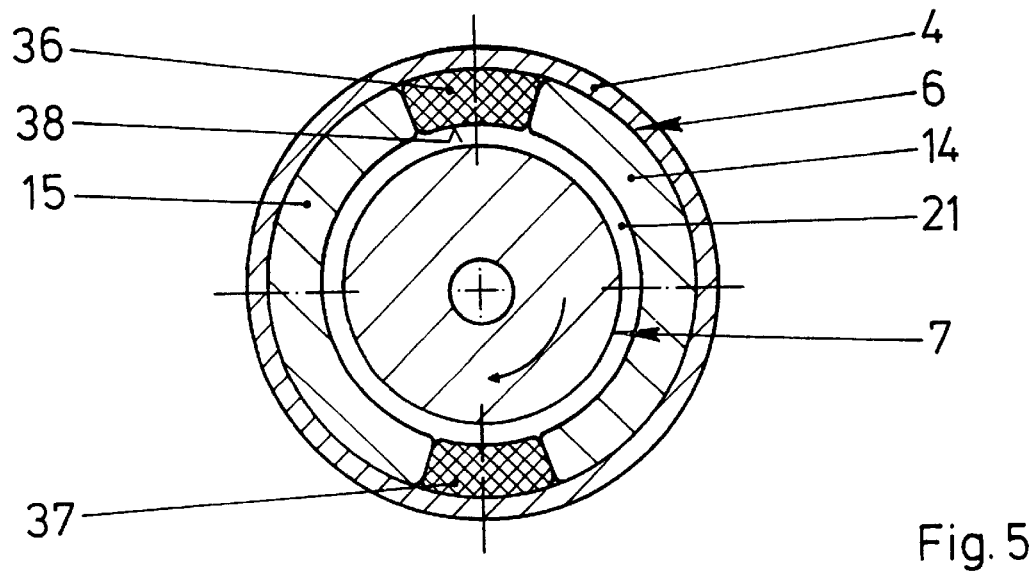
FIG. 5 illustrates an alternate embodiment of the electric motor according to the invention in cross sections.

FIG. 5 shows a further exemplary embodiment of the electric motor according to the invention in cross section, in which spring elements 36, 37 are formed as plastic moldings. The spring elements 36, 37 are manufactured from an elastomeric material and are of solid design. As a result, the magnetic shells 14, 15 are held in a fixed relationship due to the inherent elasticity of the spring elements 36, 37. In their region facing the rotor 7, the spring elements 36, 37 each have a smooth face 38 flush with the magnetic shells 14, 15.

We claim:

1. An electric motor for a fluid pump comprising:
   (a) a rotor assembly having coils arranged on a shaft; and
   (b) a stator assembly surrounding the rotor assembly and defining an annular fluid passage between the rotor and the stator, the stator assembly including:
      (1) a tubular stator housing having an inner wall and a diaphragm portion that covers circumferential stops of the stator housing;
      (2) a plurality of magnetic shells disposed in contact with the tubular housing inner walls at arcuately spaced apart locations, wherein the shells have arcuate inner surfaces that are all the same radial distance from the tubular housing inner wall and the rotor assembly; and
      (3) a spring element located in each space between each pair of adjoining magnetic shells to hold the shells in assembled position within the tubular housing, wherein each spring element has a substantially smooth arcuate surface that is substantially level with a radially inner boundary of the magnetic shells.

2. The electric motor of claim 1, wherein the spring element and the diaphragm extend over an entire length of the magnetic shells.

3. The electric motor of claim 1, wherein legs are provided which are attached to the spring and extend radially outwardly from two sides of the arcuate surface.

4. The electric motor of claim 3, wherein the non-attached ends of the legs are angled toward one another.

5. The electric motor as claimed in claim 1, wherein the spring elements are comprised of a C-shaped portion, and wherein the diaphragm portion is arranged in a region level with the magnetic shells at one end of the C-shaped portion.

* * * * *